United States Patent
Kapila et al.

(10) Patent No.: US 8,910,065 B2
(45) Date of Patent: Dec. 9, 2014

(54) SECONDARY OUTPUT GENERATION FROM A PRESENTATION FRAMEWORK

(75) Inventors: Gaurav Kapila, Redmond, WA (US); Vipul Malhotra, Kirkland, WA (US); Bahadir Onalan, Bellevue, WA (US); Jagadeesh Kalki, Redmond, WA (US); Mark Sterin, Redmond, WA (US); Dan Boldo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 12/941,087

(22) Filed: Nov. 8, 2010

(65) Prior Publication Data

US 2012/0117498 A1  May 10, 2012
US 2014/0040795 A9  Feb. 6, 2014

Related U.S. Application Data

(60) Provisional application No. 61/382,657, filed on Sep. 14, 2010.

(51) Int. Cl.
*H04N 21/41* (2011.01)
*H04N 21/431* (2011.01)
*G06F 3/14* (2006.01)

(52) U.S. Cl.
CPC ...... *G06F 3/1454* (2013.01); *G09G 2340/0407* (2013.01); *G09G 2340/0464* (2013.01); *H04N 21/4316* (2013.01)
USPC ............ 715/764; 715/815; 715/816; 715/817

(58) Field of Classification Search
CPC .. H04N 21/4316; G06F 3/1454; G06F 9/4443

USPC ................... 715/815, 816, 817, 764
See application file for complete search history.

(56) References Cited

U.S. PATENT DOCUMENTS

| | | | | |
|---|---|---|---|---|
| 5,657,221 A | * | 8/1997 | Warman et al. | 700/83 |
| 5,757,925 A | * | 5/1998 | Faybishenko | 709/203 |
| 6,154,209 A | * | 11/2000 | Naughton et al. | 715/764 |
| 6,496,203 B1 | * | 12/2002 | Beaumont et al. | 715/762 |
| 6,710,753 B2 | * | 3/2004 | Gillespie et al. | 345/2.1 |
| 7,571,391 B2 | * | 8/2009 | Roessler | 715/764 |

(Continued)

OTHER PUBLICATIONS

Delimarsky, Dennis, "Hosting WPF controls in a WinForms application", Retrieved at << http://dotnet.dzone.com/articles/hosting-wpf-controls-winforms >>, Jul. 9, 2010, pp. 3.

(Continued)

*Primary Examiner* — William Bashore
*Assistant Examiner* — Nathan Shrewsbury
(74) *Attorney, Agent, or Firm* — Jim Sfekas; Kate Drakos; Micky Minhas (57) ABSTRACT

A secondary output of a user interface created using a presentation framework may be created by making a clone of the user interface, then modifying the cloned user interface by expanding various components. The cloned user interface may also be configured to the output characteristics of the secondary output, which may be a printer or other hardcopy device. The user interface may be created with callbacks or other actions that may be executed when the cloned user interface is configured. The callbacks may cause certain user interface components to be changed on the cloned version of the user interface.

17 Claims, 4 Drawing Sheets

(56) References Cited

U.S. PATENT DOCUMENTS

| | | | |
|---|---|---|---|
| 8,054,241 B2* | 11/2011 | Muklashy et al. | 345/1.1 |
| 8,402,373 B2* | 3/2013 | Ferlitsch | 715/733 |
| 2003/0208529 A1* | 11/2003 | Pendyala et al. | 709/203 |
| 2004/0163046 A1* | 8/2004 | Chu et al. | 715/517 |
| 2005/0086608 A1* | 4/2005 | Roessler | 715/764 |
| 2007/0033522 A1* | 2/2007 | Lin et al. | 715/526 |
| 2007/0198950 A1* | 8/2007 | Dodge et al. | 715/815 |
| 2007/0229465 A1* | 10/2007 | Sakai et al. | 345/173 |
| 2008/0068290 A1* | 3/2008 | Muklashy et al. | 345/2.1 |
| 2008/0158582 A1 | 7/2008 | Uotani | |
| 2009/0064021 A1* | 3/2009 | Boettcher et al. | 715/766 |
| 2009/0144652 A1* | 6/2009 | Wiley | 715/800 |
| 2009/0259951 A1 | 10/2009 | Whitechapel et al. | |
| 2009/0265368 A1 | 10/2009 | Crider et al. | |
| 2010/0095214 A1* | 4/2010 | Ferlitsch | 715/733 |
| 2010/0274869 A1* | 10/2010 | Warila et al. | 709/217 |
| 2012/0042268 A1* | 2/2012 | Ekpar | 715/763 |
| 2012/0044061 A1* | 2/2012 | Sakai et al. | 340/12.5 |

OTHER PUBLICATIONS

"Introduction to WPF", Retrieved at << http://msdn.microsoft.com/en-us/library/aa970268.aspx>>, Aug. 13, 2010, pp. 25.

"Printing Overview", Retrieved at << http://msdn.microsoft.com/en-us/library/ms742418.aspx >>, Aug. 13, 2010, pp. 9.

"SystemBuilder Extensible Architecture (SB/XA)", Retrieved at << http://www.rocketsoftware.com/u2/pubs/datasheets/SBXA_Datasheet.pdf >>, pp 4.

Collins, et al., "ANALySiS: XPS for BuSiNeSS and SoHo PriNtiNG", Retrieved at << http://www.globalgraphics.com/xps/business_soho.pdf >>, Global Graphics White Paper, Apr. 2007, p. 1-11.

Pankaj, "How to Print in WPF to Fit to printing page", Retrieved at << http://www.a2zdotnet.com/View.aspx?id=66 >>, Aug. 10, 2008, pp. 3.

* cited by examiner

SECONDARY OUTPUT GENERATION FROM A PRESENTATION FRAMEWORK

CROSS REFERENCE TO RELATED APPLICATIONS

This application claims the benefit of U.S. Provisional Patent Application No. 61/382,657, entitled "Secondary Output Generation From A Presentation Framework", filed Sep. 14, 2010, by Gaurav Kapila et al.

BACKGROUND

Presentation frameworks are software components that generate user interfaces and other graphical output and may be called from applications. A presentation framework may have many functions that simplify a programmer's task by providing various functions for generating a user interface, many of which may be quite complex.

SUMMARY

A secondary output of a user interface created using a presentation framework may be created by making a clone of the user interface, then modifying the cloned user interface by expanding various components. The cloned user interface may also be configured to the output characteristics of the secondary output, which may be a printer or other hardcopy device. The user interface may be created with callbacks or other actions that may be executed when the cloned user interface is configured. The callbacks may cause certain user interface components to be changed on the cloned version of the user interface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A user interface may be prepared for printing by creating a clone of a displayed user interface, then making modifications to the clone. The displayed user interface may remain on a graphical user interface without modification, while the cloned user interface may be manipulated for printing by reformatting to match an output device, expand or contract various items, or perform additional functions.

Presentation frameworks are used in many operating systems to display items on a graphical user interface. In many embodiments, a presentation framework may be a service or set of functions that are bound to data and layout description in an application. When the application updates or changes the data or the layout description, the presentation framework may update the user interface. Because of the data binding, the presentation framework may be performing changes to the user interface in parallel with the application performing other functions.

When a user interface may be selected for printing or any type of secondary display, a clone may be made of the original user interface. Modifications to the cloned user interface may be performed in memory, without affecting the user interface on a display.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

Figure 1:
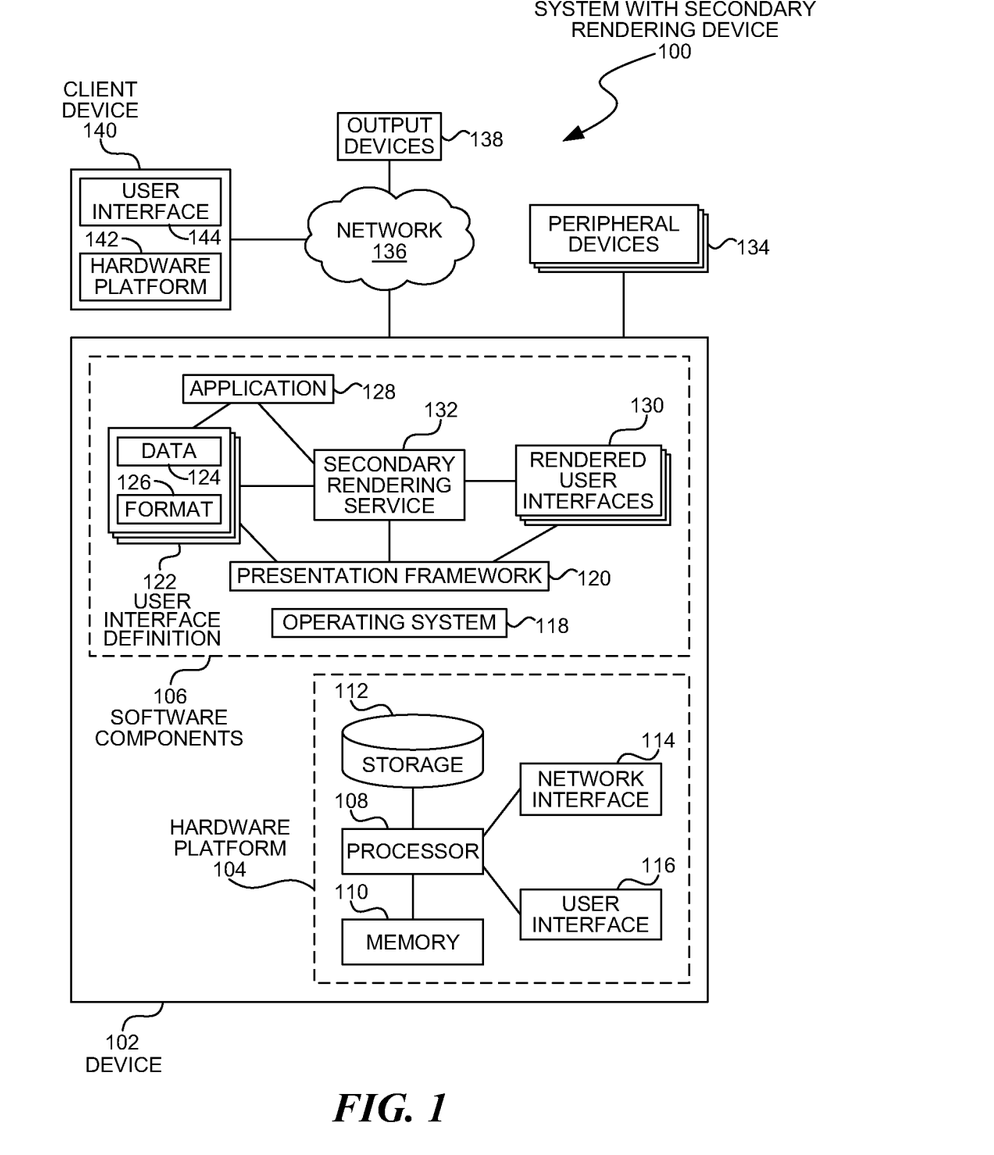
FIG. 1 is a diagram illustration of an embodiment showing a system with a secondary rendering service.

FIG. 1 is a diagram of an embodiment 100, showing a system that may use a presentation framework for generating and rendering user interfaces. Embodiment 100 is a simplified example of an environment in which a presentation framework may operate, and one in which a secondary rendering service may prepare a clone of a user interface for rendering on a secondary output device.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 is an example of a conventional computing device that may use a presentation framework to render a user interface. A presentation framework may be a set of utility functions that generates and renders a user interface. In many embodiments, the presentation framework may bind to a user interface definition that may be created by an application. The binding may cause changes to the user interface definition to be automatically applied to a rendered user interface.

For example, an application may update a data value that is bound to a user interface control provided by the presentation framework and presented on a graphical display. When the data value is updated by the application, the presentation framework may instantly update a graphical user interface.

A presentation framework may be linked to an application when an application is compiled. The presentation framework may include many capabilities for creating and updating user interfaces that may relieve a programmer from having to so the same.

Presentation frameworks may often contain various user interface controls, which may be input or output items that are rendered onto a display. A simple user interface control may be a textbox, which may be used to display text as well as capture text. A more complex user interface control may be a dial meter that displays a pointer representing a numerical value.

Presentation frameworks often have sophisticated layout and manipulation tools. The layout and manipulation tools may define where certain objects may be placed on the user interface, as well as manipulating the objects within the layout. In some embodiments, the presentation frameworks may allow animation or other movement or dynamic changes to objects within the user interface.

Some presentation frameworks may include specialized tools for rendering text. For example, some presentation frameworks may render text in various fonts or sizes and with specific colors, shading, and transparency.

In many use scenarios, a presentation framework may be used to present output from an application on a graphical user interface, which may be a display monitor, for example. A user may interact with the graphical user interface, but at some point the user may wish to have the user interface rendered on a second device, such as a hardcopy device like a printer.

In such a use scenario, there are two factors that may affect the user interface. The first factor may be the output characteristics of the second device, such as the display size or color capabilities. The second factor may be the expansion or contraction of various user interface controls within the user interface. The first factor may be device-based formatting, while the second factor may be content-based or layout-based formatting.

When a user interface is converted from one rendering device to another, the user interface may be cloned and operations may be performed on the cloned user interface, while leaving the original user interface alone. The cloned user interface may be bound to the presentation framework and manipulated to account for display differences between the rendering devices.

In a typical use scenario, a user interface may be originally displayed on a monitor device, such as a liquid crystal display (LCD) monitor. The user may wish to create a hardcopy and render the user interface on a printer. A clone of the user interface may be made, and then modified to fit the printer specifications. Such modifications may include changing the user interface size and shape to match the printer as well as changing the display resolution to match the printer.

In the scenario, the items within the user interface may also be changed. For example, items that are collapsed or hidden may be expanded so that they may be seen when displayed on the printer.

In many user interfaces, especially ones where a limited amount of space is available, user interface designers may hide information using tabs, text boxes with scroll bars, or other mechanisms. In an interactive user interface such as with a conventional monitor, such mechanisms may allow far more information to be accessible to the user than were such mechanisms not used. However, on a non-interactive rendering device, such as a printer, a screen shot of the interactive user interface may not be useful, as much of the information may be hidden from view.

In such cases, the cloned user interface may be expanded so that hidden information may be exposed and rendered on the display device. In some embodiments, all of the collapsed, hidden, or partially hidden items may be expanded and exposed. In some embodiments, some items may be expanded while other items may be collapsed.

In some cases, certain user interface components may not readily lend themselves to expansion or contractions. In some such cases, a different user interface may be substituted for the first user interface component.

Embodiment 100 illustrates a device 102 that may have a presentation framework for generating and rendering user interfaces. The device 102 may create a cloned version of a user interface rendered on a first rendering device, then prepare the cloned user interface for presentation on a second rendering device.

The device 102 is illustrated having hardware components 104 and software components 106. The controller device 102 as illustrated represents a conventional computing device, although other embodiments may have different configurations, architectures, or components.

The controller device 102 may be a server computer, desktop computer, or comparable device. In some embodiments, the controller device 102 may be a laptop computer, netbook computer, tablet or slate computer, wireless handset, cellular telephone, or any other type of computing device.

The hardware components 104 may include a processor 108, random access memory 110, and nonvolatile storage 112. The hardware components 104 may also include a user interface 116 and network interface 114. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 116 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 114 may be any type of connection to another computer. In many embodiments, the network interface 114 may be a wired Ethernet connection. Other embodiments may include wired or wireless connections over various communication protocols.

The software components 106 may include an operating system 118 on which various applications and services may operate. An operating system may provide an abstraction layer between executing routines and the hardware platform 104, and may include various routines and functions that communicate directly with various hardware components.

The software components 106 may include a presentation framework 120. The presentation framework 120 may be a set of functions that may be called to generate and render user interfaces. In many embodiments, the presentation framework may include data types, methods, assemblies, dynamic linked libraries, or other software components that may generate and render a user interface.

The presentation framework 120 may consume a user interface definition 122 that may be generated by an application 128. The user interface definition 122 may include a data definition 124 and a format definition 126. The presentation framework 120 may bind to the user interface definition 122 to create rendered user interfaces 130.

The data definition 124 may include data that may be presented on a user interface. For example, a text string may be rendered as a tile or descriptor for a user interface component. The data may include numerical data, which may be rendered using a bar graph, in another example.

The layout definition 126 may include descriptors for laying out, organizing, formatting, or presenting the data defined in the data definition 124. In many cases, the layout definition 126 may specify various user interface controls, such as input and output controls, as well as presentation controls.

Input and output controls may be predefined user interface mechanisms that display and capture information. For example, a set of radio buttons may be used to present one of four options, or a text box may be used to display and capture string data types.

Presentation controls may be used to condense information within a user interface. In many cases, a rendering device may have a fixed size, such as a monitor screen on a computer. In order to present information on the fixed size rendering device, various collapse and expand controls, tab controls, pagination controls, or other mechanisms may allow a user to navigate through the information. In such embodiments, the user interface may contain much more information than can be displayed on a single rendering.

The rendered user interfaces 130 may be presented on different rendering devices. One example of a rendering device may be a monitor display, such as an LCD display. Another example may be a printer, plotter, or other hard copy rendering device. Each device may have different properties, such as size, resolution, color capabilities, and other properties.

When changing from one rendering device to another, a secondary rendering service 132 may create a clone or copy of a first user interface to create a second user interface, then make changes to the second user interface to prepare the user interface for rendering on a second device.

In some cases, one of the rendering devices may be a peripheral device 134, which may be a printer or external display. In other cases, one of the rendering devices may be accessed over a network 136, such as various output devices 138. An examples of an output devices 138 may be a network attached printer.

In some cases, one of the rendering devices may be a client device 140. The client device 140 may communicate with the device 102, which may act as a server. The client device 140 may have a hardware platform 142 and may display a user interface 144.

In one embodiment of a client device 140, the user interface 144 may be a user interface generated by the device 102 and presented on the client 140 using a browser. In another embodiment, the client device 140 may execute a remote desktop program that may present a user interface on a locally connected rendering device, although the user interface may be generated on the device 102.

Figure 2:
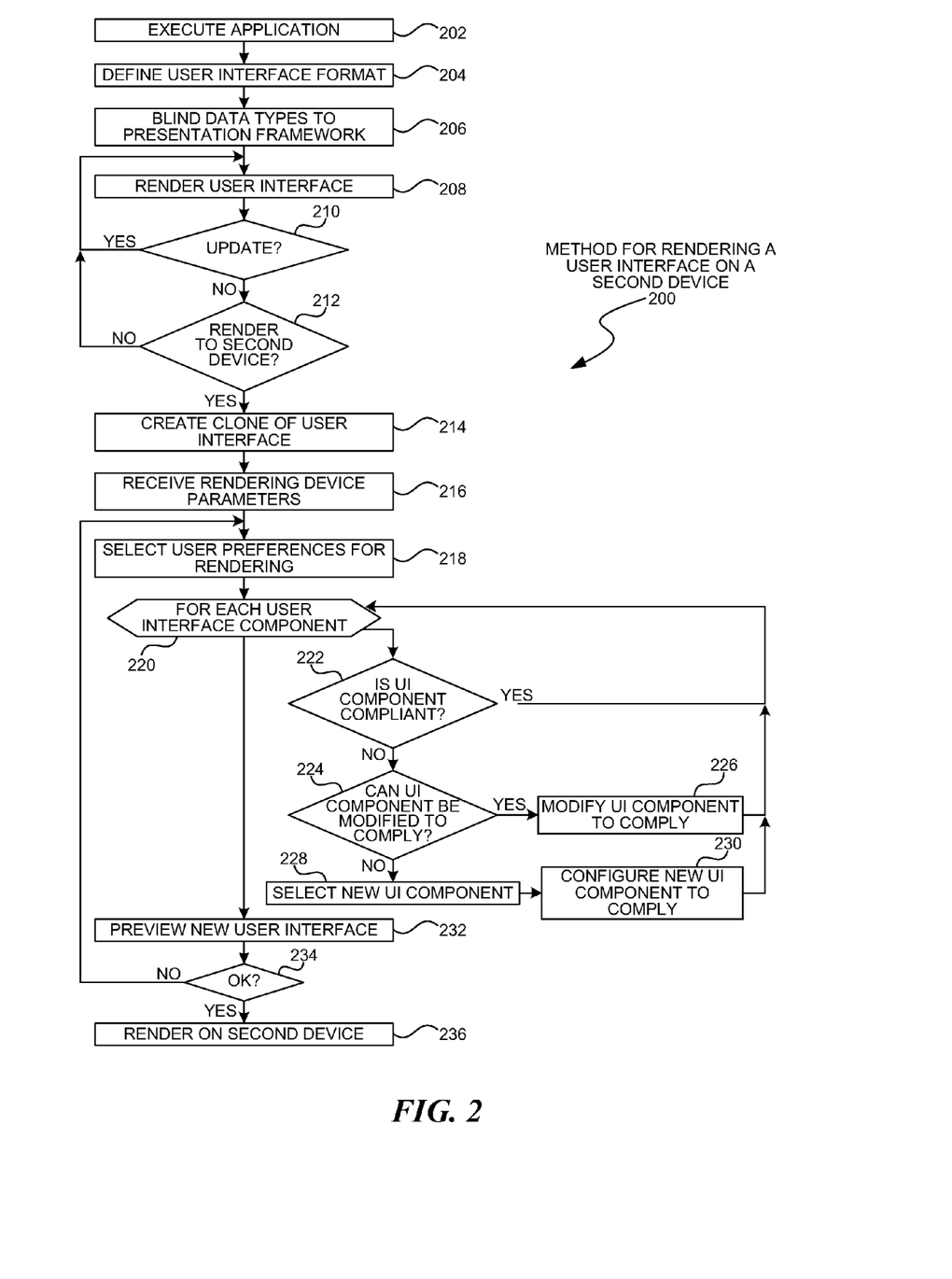
FIG. 2 is a flowchart illustration of an embodiment showing a method for rendering a user interface on a second device.

FIG. 2 is a timeline illustration of an embodiment 200 showing a method for rendering a user interface on a second device. The process of embodiment 200 is a simplified example of how a user interface may be presented on a first rendering device, then cloned and the clone user interface may be updated for presenting on a second rendering device.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a method by which a user interface may be presented on a second rendering device.

In a use scenario, a user interface may be presented on an interactive rendering device, and then prepared for presentation on a non-interactive rendering device. An interactive rendering device may be a computer monitor, where a user may navigate or browse through the user interface to examine various data elements. The user interface may be prepared for rendering on a non-interactive rendering device, such as a printer. In order to present the data on a printer, some of the navigation elements may be expanded, modified, or replaced so that the desired data may be presented on the printer. A simplified example of two such user interfaces may be found in FIGS. 3 and 4 later in this specification.

In another use scenario, a user interface on one device may be converted to be presented on a second device. For example, a user interface on a cellular telephone with a very limited display may be reconfigured for viewing on a larger display, such as a personal computer.

An application may execute in block 202 and may generate a user interface. The application may be any type of executable operable on a computer processor that may present information on a user interface.

The application may define a user interface format in block 204 and bind data types to a presentation framework in block 206. The presentation framework may render the user interface in block 208.

In object oriented programming environments, a presentation framework may be engaged by an application by binding various data types and invoking methods. Other embodiments may engage a presentation framework by calling subroutines within the presentation framework or using some other mechanism.

When an update may be made to either the layout or underlying data of the user interface in block 210, the user interface may be rendered again in block 208. This loop may be executed many times during an interactive session with a user interface, or may be executed many times while data are being updated or created for the user interface.

At some point during the interaction with the user interface, a user may indicate that the user interface may be rendered to another device in block 212. An example may be to request that the user interface be printed.

In order to prepare the user interface for rendering on a second device, a clone of the user interface may be made in block 214. The clone may be modified or changed in several ways prior to rendering the user interface on the second device. From this point forward in the process, all of the operations may be performed on the cloned user interface and the original or first user interface may remain unchanged.

The parameters describing the rendering device may be received in block 216. The parameters may define size of the rendered output, rendering resolution, or other parameters.

In block 218, user preferences for rendering may be received. In some cases, a user may request that all of the hidden items be expanded, all of the items collapsed, or certain items expanded and others collapsed. The request may come in the form of a configuration file with predefined preferences in some embodiments. Some embodiments may present an interactive user interface to a user and allow the user to select rendering preferences prior to generating the modified user interface. Other embodiments may have preferences defined by the application, where the preferences may change due to the status of the application. Still other embodiments may have other manners for determining user preferences.

Each user interface component may be evaluated in block 220. For each user interface component in block 220, if the user interface component is compliant with the device parameters and the user preferences, the user interface component is skipped and the process returns to block 220.

If the user interface component is not compliant in block 222, and the user interface component can be modified to comply with the device parameters and the user preferences in block 224, the modification may be made in block 226.

If the user interface component is not compliant in block 222, and the user interface component cannot be modified to comply in block 224, a new user interface component may be selected in block 228 and the new user interface component may be configured to comply with the device parameters and the user preferences in block 230.

For example, a user interface component may be an expander button. An expander button may expand to display a section of the user interface when activated, and may collapse when not activated. In the collapsed state, the information within the section controlled by the expander may not be shown to the user. When printing a version of a user interface with an expander, some or all of the collapsed sections may be expanded so that the information in the section may be presented on the printed version.

After making modifications to the cloned or second user interface, the new user interface may be presented to the user in block 232 as a preview. If the preview is unacceptable to the user in block 234, the process may return to block 218 so that the user may change their preferences.

Once the preview is acceptable in block 234, the second user interface may be rendered on the second device in block 236.

Figure 3:
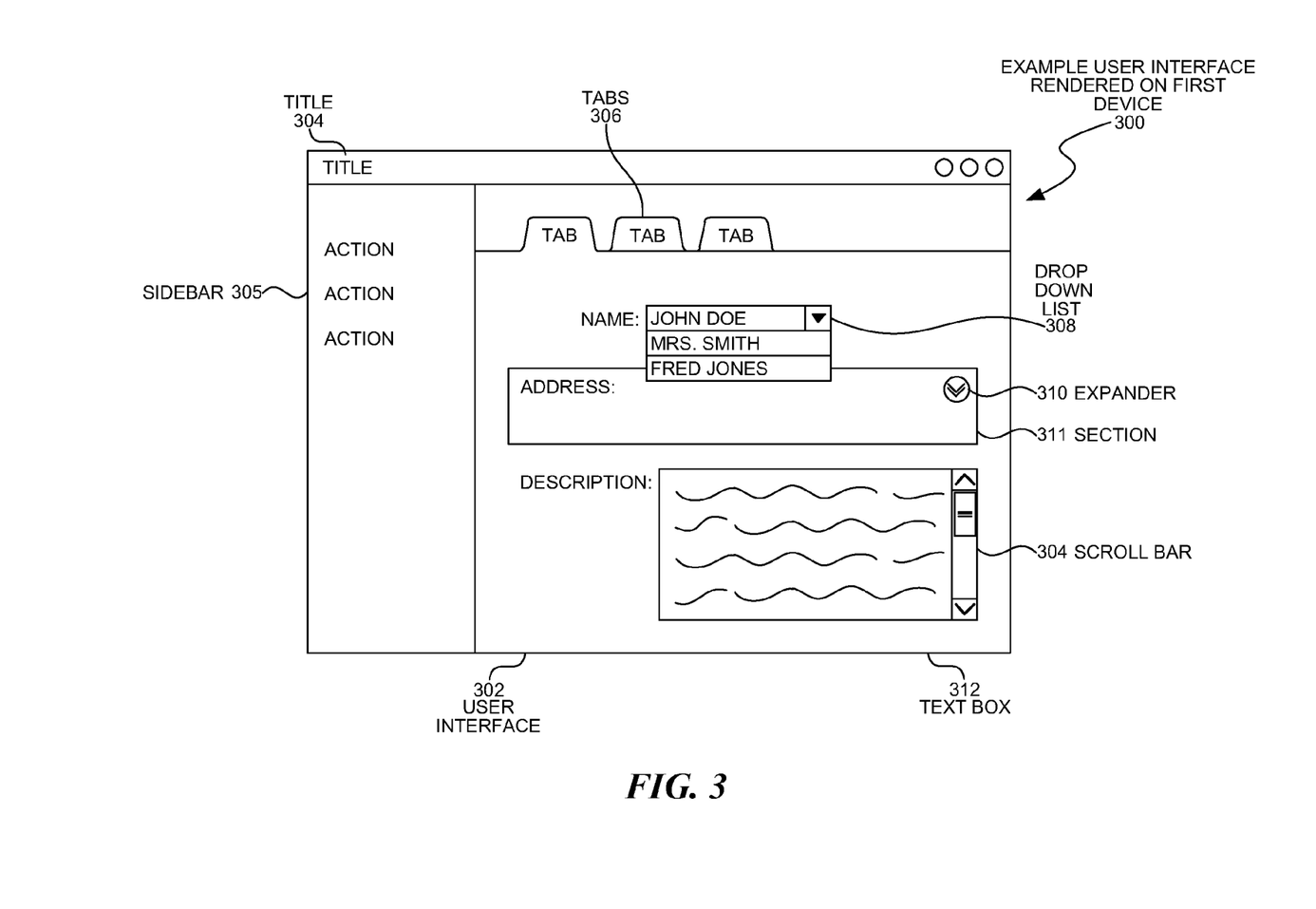
FIG. 3 is an illustration of a sample embodiment showing a user interface rendered on a first device.

FIG. 3 is an example embodiment 300 showing an example user interface rendered on a first device.

In the example, embodiment 300 may be a user interface 302 that may be displayed on a computer monitor or other display mechanism that may be interactive. A user may be able to browse through the user interface with various controls to view or change information within the display.

The user interface 302 may have a title 304 laid out in a header across the top of the user interface. A sidebar 305 may contain some navigation user interface controls that may allow a user to skip to a specific portion of the user interface.

The user interface 302 may have several tabs 306. The tabs 306 may allow different sets of data to be organized into groups, and each tab 306 may be displayed one at a time. The tab control is one mechanism by which a user interface may have information hidden from the user, but the user may be able to browse to the information. As shown, the first tab portion is displayed to the user, but the second and third tabs represent information that is hidden.

A drop down list 308 is illustrated as a user interface control that may present several discrete options to a user, with one of the discrete options being selected. In the case of drop down list 308, the option "John Doe" is selected.

An expander 310 may be a user interface that controls a section 311 that may be partially hidden from view. Because the section 311 is collapsed, other items, such as the text box 312 may be viewable within the user interface 302. If the section 311 was expanded, the text box 312 may not be viewable.

The text box 312 may be a fixed size, but may contain more text than is possible to show within the fixed size. As such, a scroll bar 314 may be used to navigate up and down through the text box 312. In such a situation, some of the text may be visible, while other text may be hidden.

Figure 4:
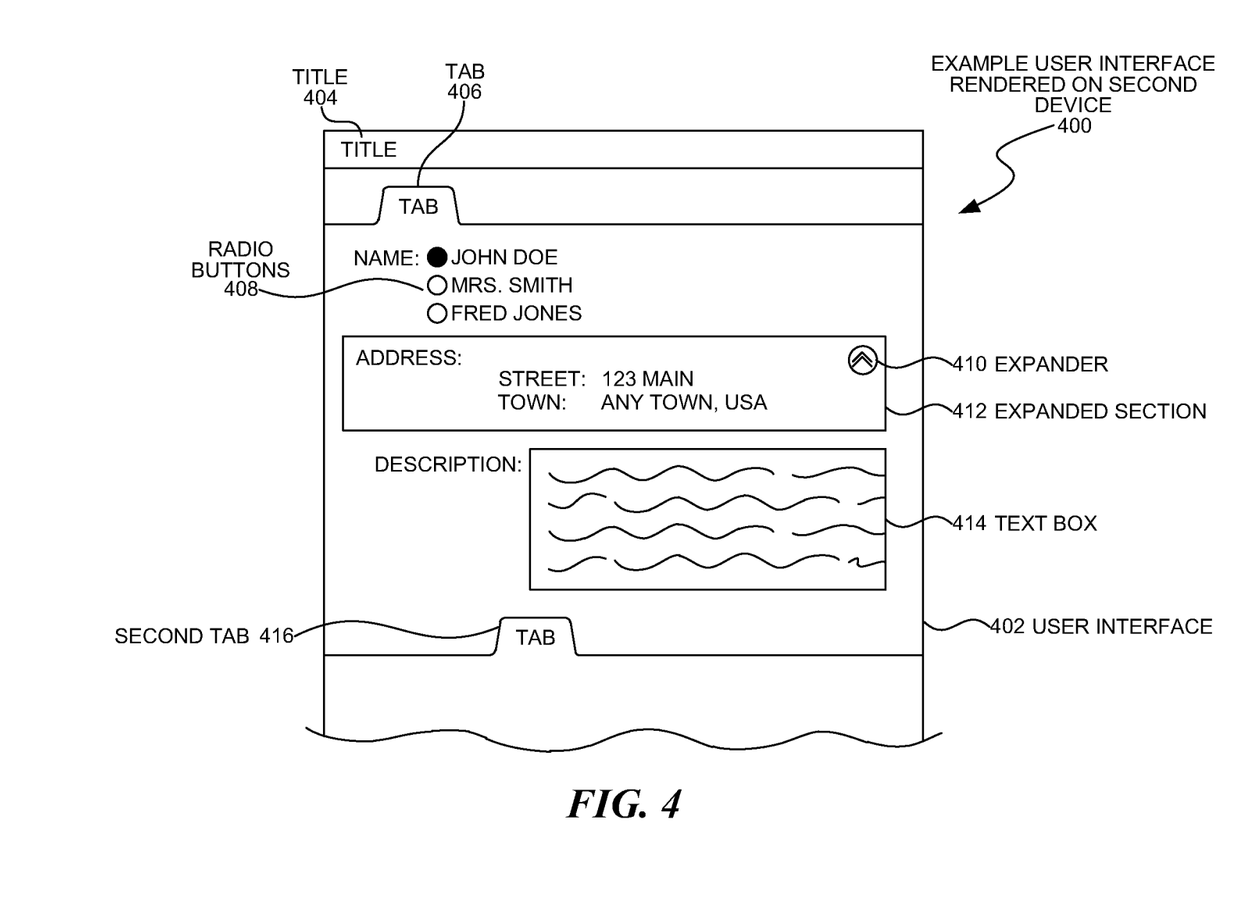
FIG. 4 is an illustration of the user interface from FIG. 3 rendered on a second device.

FIG. 4 is an example embodiment 400 showing a modified version of the user interface 302 presented in FIG. 3. The example of embodiment 400 may represent a version of user interface 302 that is cloned and prepared for printing.

In a printed rendering of a user interface, the length of the user interface may be arbitrarily long, as the printer may print the user interface on several pages. When modifying a user interface from a version on a monitor to a version for a printer, the user interface may be expanded so that hidden data may be exposed in the user interface. An example of such an operation may be found in comparing the user interface 302 of FIG. 3 and the user interface 402 of FIG. 4.

User interface 402 may include a title 404, in a similar fashion as title 304. Because the side bar 305 of the user interface 302 may not be useful for a printed or non-interactive version of the user interface, the side bar controls may be removed from the user interface 402.

The tabbed sections of user interface 302 may be an efficient mechanism for displaying a large amount of data within an interactive user interface, but in a non-interactive rendering of that user interface, the tabs may be expanded. In embodiment 400, the first tab section is presented under tab 406. The second tab section may be presented further down as tab 416.

The drop down list 308 of embodiment 300 may be replaced with a set of radio buttons 408. In the embodiment 400, the drop down list 308 may not be compliant with the configuration of the user interface 402 and therefore the drop down list 1308 may be replaced with the radio buttons 408. Both the radio buttons 408 and drop down list 1308 may be used to represent the same data type, but with different user interface controls.

The expander 410 may be expanded in embodiment 400, showing the contents of the expanded section 412.

Similarly, the text box 414 may be enlarged to fit the amount of text contained in the text box.

Embodiment 400 is merely one simplified example of how a user interface 302 may be copied and modified to fit the user preferences and rendering device parameters.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method performed on a computer processor, said method comprising:
   creating a renderable user interface for an application, said renderable user interface configured for rendering on a rendering device, said renderable user-interface including a user-interface component;
   receiving a request to render said renderable user interface on a second different rendering device;
   creating a copy of said renderable user interface, said copy of said renderable user interface including said user interface component;
   modifying said copy of said renderable user interface into a second renderable user interface, said second renderable user interface fitting the specifications of said second different rendering device, modifying said copy of said renderable user interface comprising:
      determining that said user interface component is not compliant with said second different rendering device; and
      replacing said user interface component in said copy of said renderable user interface with a second different user interface component, said second different interface component fitting said specifications of said second different rendering device, replacing said user interface component including:
         determining that said user interface component is associated with hidden data, said hidden data collapsed when said user interface component is rendered at said rendering device but displayable in response to user input selecting said user interface component at said rendering device; and
         modifying said second user interface component so that said hidden data is exposed upon rendering said second user interface at said second different rendering device; and
   causing said second renderable user interface to be rendered on said second different rendering device.

2. The method of claim 1, wherein replacing said user interface component in said renderable user interface copy with a second different user interface component comprises:
   identifying a callback within said user interface definition, said callback defining a function to replace said user interface component with said second different user interface component; and
   calling said function based on said callback.

3. The method of claim 1, said second user interface component being one of a group composed of:
   an expander control;
   a tab control;
   a list box control;
   a drop down menu control; and
   a text box.

4. The method of claim 1, said rendering device having a first size for said first user interface component and said second different rendering device having a second different size for said second user interface component.

5. The method of claim 4, said first size being such that at least a portion of contents for said first user interface component is hidden.

6. The method of claim 1 further comprising:
   presenting a preview showing said second renderable user interface prior to rendering said second renderable user interface on said second different rendering device.

7. The method of claim 1, wherein modifying said copy of said user interface comprises:
   presenting at least two options for rendering said COPY of said user interface at said second different rendering device and requesting user input to select between said at least two options.

8. A system comprising:
   a processor;
   system memory;
   one or more computer storage devices having stored thereon computer-executable instructions representing a presentation framework and a secondary rendering service, wherein the presentation framework is configured to:
      create a renderable user interface for an application, said renderable user interface configured for rendering on a rendering device, said renderable user interface including a user interface component;
   wherein said secondary rendering service is configured to:
      receive a request to render said renderable user interface on a second different rendering device;
      create a copy of said renderable user interface, said copy of said renderable user interface copy including said user interface component;
      modify said copy of said renderable user interface into a second renderable user interface, said second renderable user interface fitting the specifications of said second different rendering device, modifying said copy of said renderable user interface copy comprising:

determine that said user interface component is not compliant with said second different rendering device; and replace said user interface component with a second user interface component, said second different interface component fitting said specifications of said second different rendering device replacing said user interface component including:

determine that said user interface component is associated with hidden data, said hidden data collapsed when said user interface component is rendered at said rendering device but displayable in response to user input selecting said user interface component at said rendering device; and modify said second user interface component so that said hidden data is exposed upon rendering said second user interface at said second different rendering device; and render said second renderable user interface on said second different rendering device.

9. The system of claim 8, said presentation framework comprising data definitions and layout definitions, said layout definitions comprising user interface components.

10. The system of claim 8, said second rendering device being a hardcopy rendering device.

11. The system of claim 8, wherein said secondary rendering service being configured to replace said user interface component in said renderable user interface copy with a second different user interface component comprises said secondary rendering service being configured to:

identify a callback within said user interface definition, said callback comprising a function to replace said user interface component with said second different user interface component; and call said function.

12. The system of claim 11, said function being associated with said user interface component.

13. The system of claim 8, said presentation framework further configured to apply a first set of styles to said user interface.

14. The system of claim 13, said secondary rendering service configured to apply a second different set of styles to said renderable user interface copy.

15. A computer program product for use at a computer system, said computer program product for implementing a method for rendering a user-interface, said computer program product comprising one or more computer storage devices having stored thereon computer-executable instructions that, when executed at a processor, cause the computer system to perform the method, including the following:

create a renderable user interface for an application, the created renderable user interface for rendering on a rendering device, said renderable user interface including a user interface component;

receive a request to render said user interface on a second different rendering device;

create a copy of said renderable user interface, said copy of said renderable user interface copy including said user interface component;

modify said copy of said renderable user interface into a second renderable user interface, said second renderable user interface fitting specifications of said second different rendering device, modifying said renderable user interface copy comprising:

determine that said user interface component is not compliant with said second different rendering device; and replace said user interface component in said copy of said renderable user interface with a second user interface component, said second different interface component fitting said specifications of said second different rendering device replacing said user interface component including:

determine that said user interface component is associated with hidden data, said hidden data collapsed when said user interface component is rendered at said rendering device but displayable in response to user input selecting said user interface component at said rendering device; and modify said second user interface component so that said hidden data is exposed upon rendering said second user interface at said second different rendering device; and cause said second renderable user interface to be rendered on said second different rendering device.

16. The computer program product of claim 15, further comprising computer-executable instructions that, when executed, cause the computer system to expand said second user interface component for rendering at said second different rendering device.

17. The computer program product of claim 16, said rendering device having a first size for said second user interface component and said second different rendering device having a second different size for said second user interface component.

* * * * *